(12) United States Patent
Frieswick et al.

(10) Patent No.: US 7,033,263 B2
(45) Date of Patent: Apr. 25, 2006

(54) PIVOT ACTION BIVALVE OPENING SYSTEM

(75) Inventors: Kevin Frieswick, 288 Firetown Rd., Simsbury, CT (US) 06070; Melissa Frieswick, Simsbury, CT (US)

(73) Assignee: Kevin Frieswick, Simsbury, CT (US)

( * ) Notice: Subject to any disclaimer, the term of this patent is extended or adjusted under 35 U.S.C. 154(b) by 0 days.

(21) Appl. No.: 10/877,694

(22) Filed: Jun. 26, 2004

(65) Prior Publication Data

US 2006/0009144 A1    Jan. 12, 2006

(51) Int. Cl.
    *A22C 29/04*    (2006.01)
(52) U.S. Cl. .......................... 452/17; 452/13
(58) Field of Classification Search ............ 452/1, 452/6, 9, 12, 13, 16, 17
    See application file for complete search history.

(56) References Cited

U.S. PATENT DOCUMENTS

| | | | |
|---|---|---|---|
| 189,966 A * | 4/1877 | Temple | 452/16 |
| 210,032 A * | 11/1878 | Heimlich | 452/16 |
| 845,521 A * | 2/1907 | Carlson | 452/16 |
| 2,136,816 A * | 11/1938 | Frazier | 452/16 |
| 2,520,790 A * | 8/1950 | Wesik | 452/16 |
| 2,747,220 A * | 5/1956 | Thompson | 452/16 |
| 3,748,692 A * | 7/1973 | Valentino | 452/16 |
| 4,348,788 A | 9/1982 | Jurcak | |
| 5,288,263 A | 2/1994 | Ayala | |
| 5,334,080 A | 8/1994 | Webb | |
| 5,482,500 A | 1/1996 | Boetner et al. | |
| 6,244,948 B1 | 6/2001 | LiRosi | |
| D481,272 S | 10/2003 | Jeffers | |

FOREIGN PATENT DOCUMENTS

| | | | |
|---|---|---|---|
| JP | 7-87881 | * | 4/1995 |
| WO | WO 89/00010 | * | 1/1989 |

* cited by examiner

*Primary Examiner*—Peter M. Poon
*Assistant Examiner*—David Parsley
(74) *Attorney, Agent, or Firm*—B J Associates; Bolesh J. Skutnik

(57) ABSTRACT

A system for opening bivalves employing pivot action to drive a sharp stainless steel knife blade through a shellfish is provided. Key components are the knife blade which is securely connected to a pivot shaft that is anchored in two pivot support posts. The cutting support board, which functions as the base, has raised walls, a raised central section to support each bivalve and a spout in front of the pivot shaft to pour off collected fluids from the opened shellfish. For stability and ease of positioning of the system short feet are attached at the four corners and one in the center of the support base.

8 Claims, 7 Drawing Sheets

PIVOT ACTION BIVALVE OPENING SYSTEM

BACKGROUND OF THE INVENTION

1. Field of the Invention

The present invention is directed to a bivalve opening system which is safe, easy to use and clean, and has capacity to collect natural juices for cooking or ease of cleanup.

2. Prior Art Statement

The opening of shellfish such as oysters, clams, mussels etc. can be an arduous and dangerous task, especially since normally many need to be opened generally to provide reasonable portions to diners, whether served cold or cooked. For each bivalve to be shelled, the two hinged outer shells must be opened and the strong muscle binding or maintaining the outer shells must be torn, cut or at least forced to an open position. This has generally called for significant dexterity, strength and skill whether preparing a meal for a party, an restaurant or even for an individual.

As noted in a recent patent by Ayala, U.S. Pat. No. 5,288,263 attempts to provide the 'best tool' for shucking clams, oysters and the like have been the subject of patents since at least the 1850s. In the past 20 years or so there have been several attempts made by inventors such as Jurcak U.S. Pat. No. 4,348,788 (Sept, 1982); Ayala U.S. Pat. No. 5,288,263 (February 1994); Webb U.S. Pat. No. 5,334,080 (August 1994); Boettner et al. U.S. Pat. No. 5,482,500 (January 1996); and LiRosi U.S. Pat. No. 6,244,348 (June 2001). A number of design patents have also issued including a recent one by Jeffers U.S. D481,272 (October 2003). All these provide devices which attempt to enhance shellfish opening procedures, but still leave some missing benefits which are provided by the present invention. Summaries of the identified patents and their shortcomings are given below.

The largest class of devices deal with arrangements having a type of wedge to open the half shells and a handle to leverage power to the wedge opener hopefully reducing the manual effort needed to open the shellfish. Jurcak ('788) describes a simple wedge attached to a lever arm having a somewhat L shape. The arm is attached to the side of a post. A lightly grooved base is to be used to hold the bivalve as the wedge tip engages and the open the shell. The shell is positioned perpendicular to the plane of the lever arm. Applying force to the end of the lever arm so that maximum force advantage is used, also generates potentially large torsional forces at the junction of the arm and pivoting post. No effort is made to handle the inevitable fluids accompanying the opening of the shellfish. The design is relatively barren on protection for the shucker if the shell cracks midway through opening. Also there is no provision for severing the strong muscle holding the shell, i.e. completely parting the bivalve shells.

Ayala ('263) and Webb ('080) place the lever arm between two posts to solve the torsional problem but use multiple pivot axis to attempt to enhance the opening power of their devices. This complicates the devices and requires careful attention to the multiple shafts and their connections to the vertical posts and in the case of Ayala that between the lever arm and the short arm to which is attached the wedge. The means for holding the base of the shellfish [mollusk] in each case appears to be marginal. Main safety feature relates to stopping the lever arm from being depressed far enough to pinch the hand operating it. Again in both these cases the axis of the mollusk would be perpendicular to the plane of the lever arm. Since no real concern is paid to fluid from opening bivalves, this presents the possibility of slippage of the mollusk shell during operation of the device. Also cracked or cracking shells could easily be forced out towards the operator.

Boettner et al. ('500) does have a v-groove to hold the shellfish and provide a means to remove any fluids from the base of the mollusk, but no provision is made to keep the fluids from clearing the base plate or surrounding area. Potential torsional problems are minimized by a t-type pivoting lever arm with a point operating as the wedging component. A long handle beyond the point wedge is used to multiply the applied force. Also here the shell is held in line with the plane of the lever arm, which reduces the chances for splattering or sending cracked pieces towards the operator. The use of a point contact as the wedge implement does raise a different safety aspect. The whole mollusk can be accidentally sent flying out the front of the v-groove if the wedge point contacts the shell to far off the center of its linear dimension. As with the others, but more so here, the device essentially pries open the shell without any means to directly act upon the muscle holding the half shells together. The use of the point contact enhances the pressure that can be applied but at the same time the smallness of the pressure point can enhance the chances of shattering the shell over splitting it into half shells.

LiRosi in U.S. Pat. No. 6,244,948 does approach the problem that uses a ratchet drive to apply the force directly to the shellfish opening without the problems or benefits with lever action. A punch (wedge) is engaged at the shellfish opening and driven down into the shell by the ratchet drive. The base of the bivalve is held in one of a set of grooves in the base of the opener. While being secure, a ratchet would not provide an advantage so a long bar is used to turn the ratchet screw. Set up and opening is a slow process compared to a lever action, especially if care is taken not to force the punch too quickly through the shellfish. Also as with the other prior art nothing is provided to aid in severing the muscle at the base of the shellfish from its shell. The speed issue is not too important for individual portions but for large parties or for commercial use this a real disadvantage.

Thus what is still needed is a safe, simple, fast acting device to open bivalves such as oysters, clams, scallops, mussels, etc. in a manner that permits most people to shuck shellfish in an efficient manner and preserve fluid from the shellfish for other processing or products such as broths or sauces.

SUMMARY AND OBJECTIVES OF THE INVENTION

It is an object of the present invention to provide a bivalve opening system which is efficient in operation and is sturdy and safe to use.

It is another object of the present invention to provide a bivalve opening system which is easy to use and to clean up.

It is a further object of the present invention to provide a bivalve opening system which can collect the fluids from the opened bivalves for further uses.

Briefly stated in the present invention, a system for opening bivalves employing pivot action to drive a sharp stainless steel knife blade through a shellfish is provided. Key components are the knife blade which is securely connected to a pivot shaft that is anchored in two pivot support posts. The cutting support board, which functions as the base, has raised walls, a raised central section to support each bivalve and a spout in front of the pivot shaft to pour off collected fluids from the opened shellfish. For stability and ease of positioning of the system short feet are attached at the four corners and one in the center.

The above, and other objects, features and advantages of the present invention will become apparent from the following description read in conjunction with the accompanying drawings, in which like reference numbers in different drawings denote like items.

DETAILED DESCRIPTION OF PREFERRED EMBODIMENTS

Quite generally what is described herein is an improved bivalve opening system. It employs a razor-sharp thin blade on a knife handle lever that wedges open the bivalve shell and then severs the adductor muscle at the hinged end of the bivalve. A Pivoting-Lever action initiates at the non-hinged side, and is terminated once the adductor muscles are severed. A narrow blade parts the bivalve without breaking the shell and cuts and cuts the muscle allowing the shells to part. The system provides pockets in the cutting support board base for juice collection for purposes of cooking, and to improve cleanliness. The knife blade can be lowered through full action without setting hands or knife handle into the juices or hitting the support board base. Feet on the support board base add stability, easy of lifting and reduce the potential for damaged countertops. The feet along with the unit being light make it easy to move the system for cleaning or storage. The simple, but thoughtful, design permits the knife blade to be easily sharpened by rotating it 180 degrees from normal operating position. All corners and joints in system are smooth or are radiused and fit tightly to reduce the potential to collect foreign matter. This plus the fact that it is comprised of minimal components makes the system easy to clean. Many of these aspects and especially the design of the support board base with its pockets and position and orientation of the bivalve holding pocket make the system safer than traditional bivalve opening knives and methods.

Described below are details of the preferred embodiments of the pivot action bivalve opening system as illustrated in the accompanying figures. To illustrate various features of the system.

Figure 1:
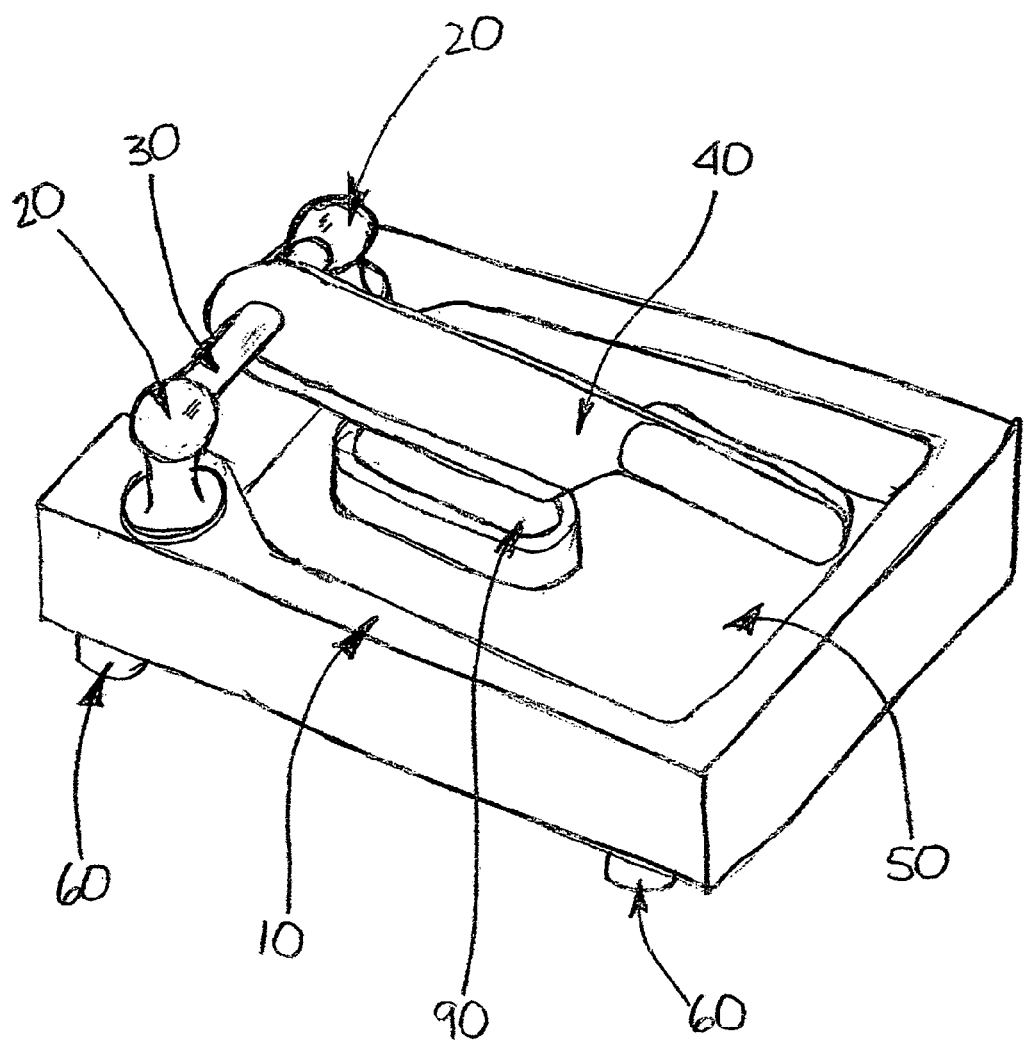
FIG. 1 shows a view of a preferred embodiment of a bivalve opening system of the present invention

In FIG. 1 cutting support board base 10 with juice collection pockets and pouring spout has pivot support posts 20 anchored in it. Pivot support posts 20 hold knife pivot shaft 30 between them. Linear bivalve opening knife 40 is securely attached to knife pivot shaft 30. Opening knife 40 pivots about a linear axis running through pivot shaft 30 which is supported at two points by pivot support posts 20 for strength. That pivot axis is transverse to the axis of the bivalve and bivalve support pocket 90. Juice collection pockets 50 cutting support board lifting feet 60 are also shown. In this figure, the whole system/assembly is shown with knife 40 in the resting position.

Figure 2:
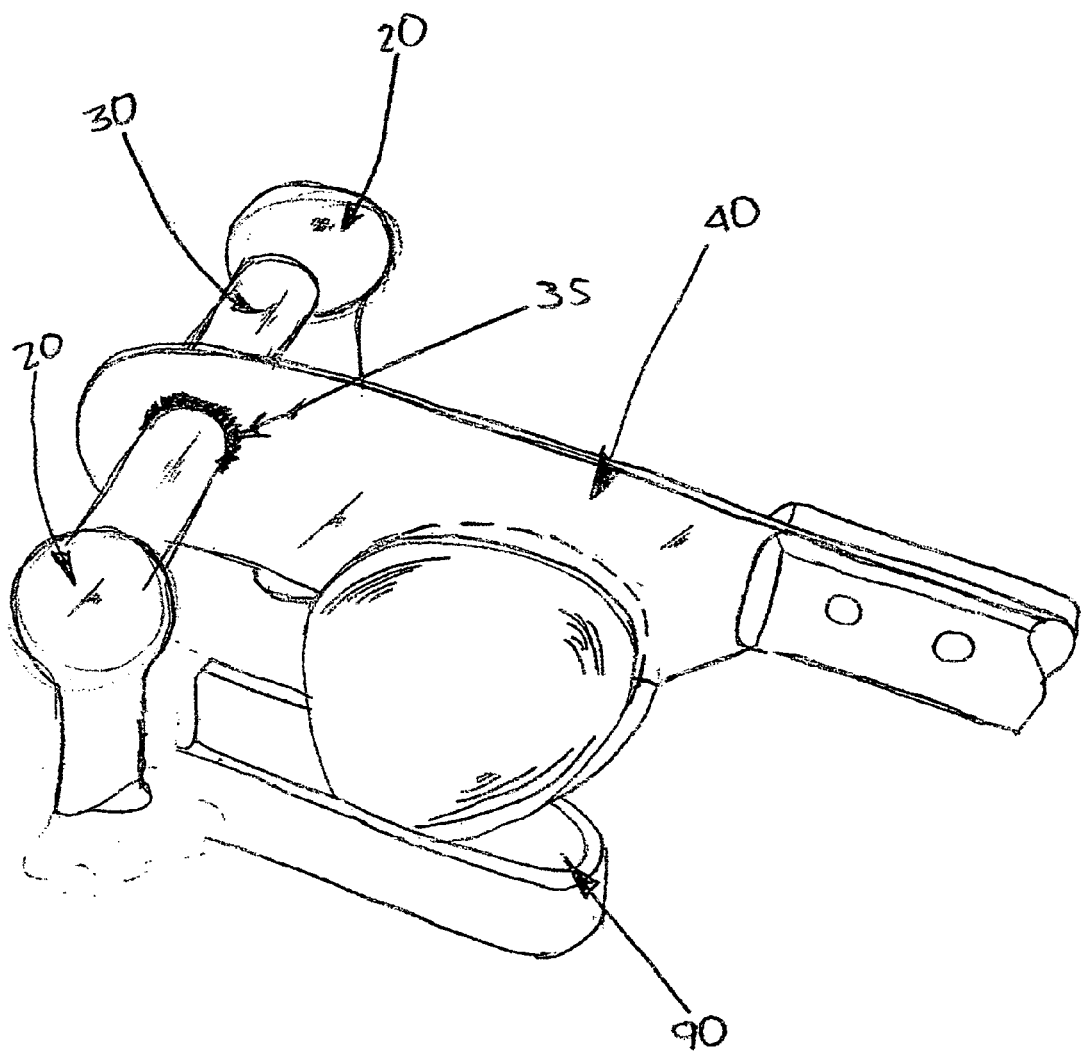
FIG. 2 shows an expanded view of the blade and pivot action for the embodiment of FIG. 1 opening a shellfish

Details of the cutting/opening operation are presented in FIG. 2. In this figure, the detail shown highlights the actual separating of the bivalve halves with linear bivalve opening knife 40. A bivalve is positioned in bivalve support pocket 90. While the bivalve is initially manually supported upright as knife 40 is lowered into position at the bivalve joint on the non-hinged side, once knife 40 is in contact with the bivalve seam light pressure can be applied to knife 40, and the manual support can be eliminated support pocket 90 now providing full support for the bivalve. Pressure is then increased on knife 40 and knife 40 joined to pivot shaft 30 begins to pivot about the traverse axis created between the joint at support posts 20 and shaft 30. Pressure is then applied until knife 40 separates the bivalve shell halves and severs the bivalve muscle at the hinged side of the bivalve. Shown in this figure is welded junction 35 of bivalve opening knife 40 to pivot shaft 30.

Figure 3:
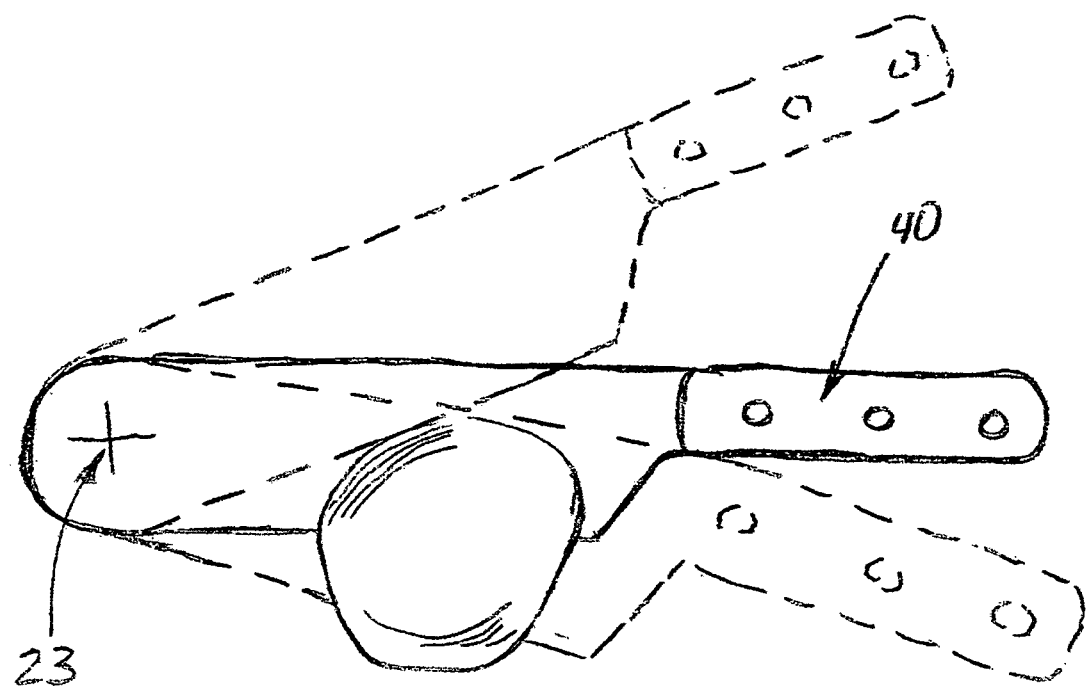
FIG. 3 illustrates action of the knife blade through a shellfish.

In FIG. 3 details of the pivot action are shown. In this figure, the motion of knife 40 is shown with a pivoting motion about traverse pivot axis 23 as knife 40 passes through a bivalve.

Figure 4:
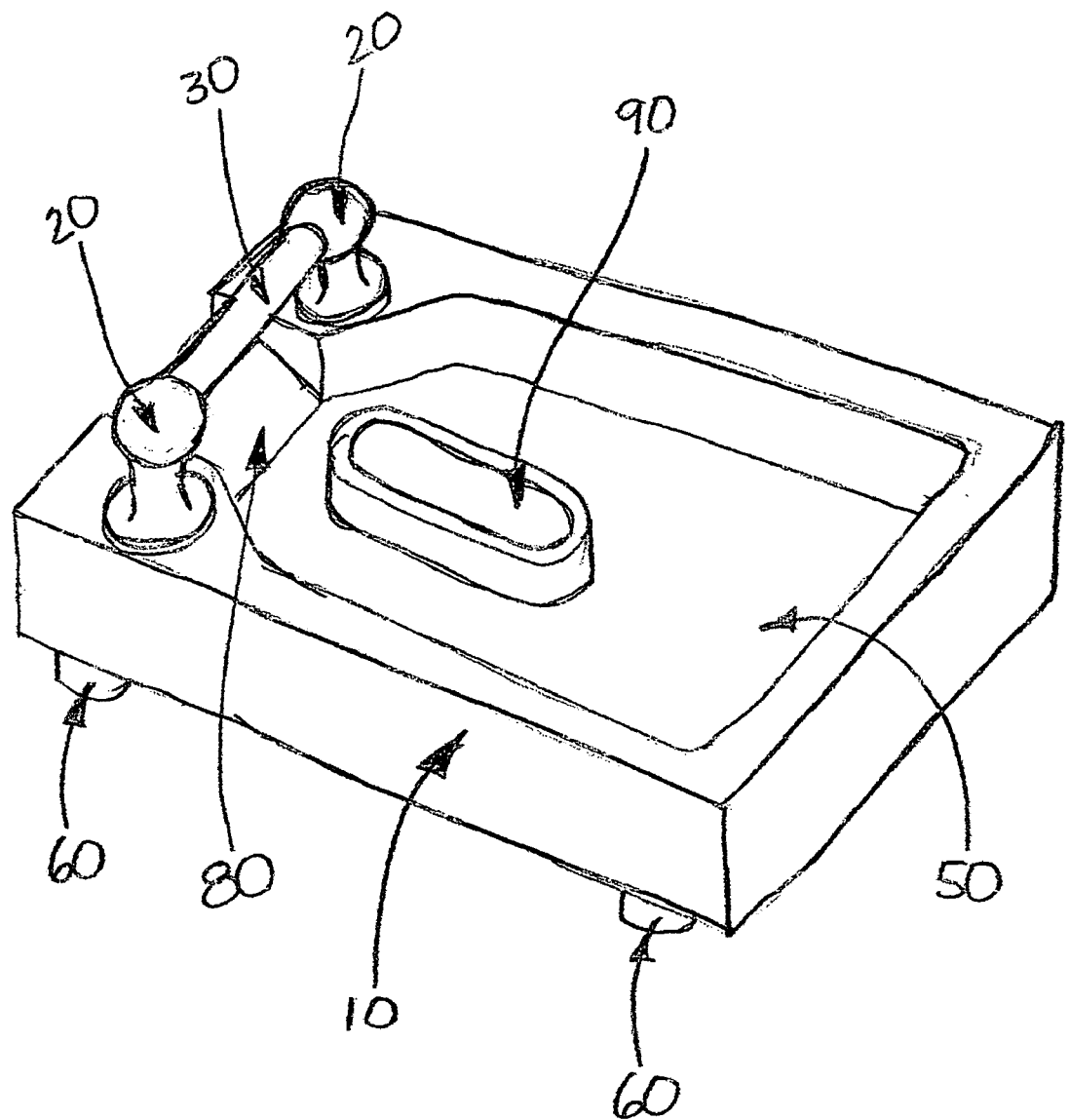
FIG. 4 illustrates a preferred embodiment without a knife blade connected to the pivot axis.

Details of cutting support board base 10 are depicted in FIG. 4 without the welded knife in place on pivot shaft 30 to provide a clearer view of juice pouring spout 80 and juice collection pockets 50. A preferred material for cutting support board base 10 is a durable material with antibacterial properties for example bamboo wood. While opening the bivalves, it is often desirable to retain the juices for use later. Juice collection pocket 50 collects the juices, as they flow from the bivalve as it's being opened, and can contain a large volume minimizing the frequency with which it must be emptied. Juice pouring spout 80 provides a means to pour the juices collected in collection pocket 50 into a container for use. After opening one or more bivalves, to pour juices, one lifts the assembly with hands on either side of the unit holding board base 10 with ones fingers beneath and thumbs on top. In a pouring motion, lift the non-pivoting end slowly higher than the pivoting end. This motion will allow the juices to flow from collection pocket 50 through spout 80 and into a collection device of ones choice. Cutting support board lifting feet 60 aid one to grasp and then to tilt the system to remove collected juices. As shown, pouring spot 80 lies under pivot shaft 30 supported between posts 20.

Figure 5:
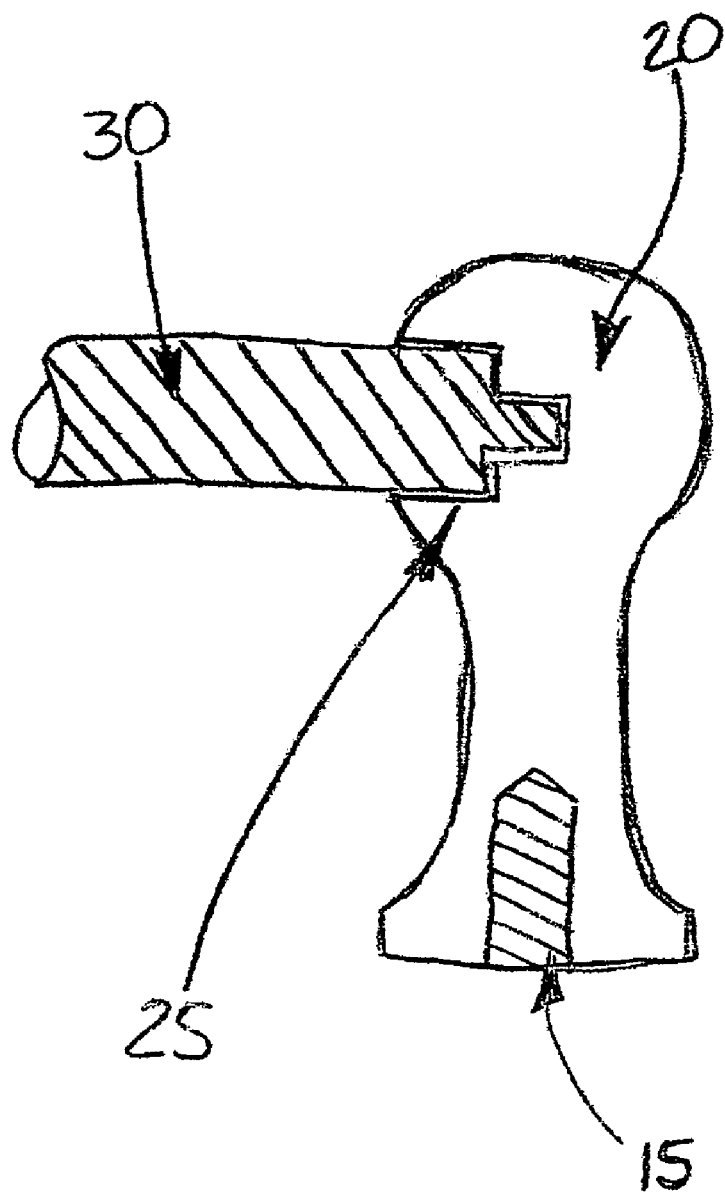
FIG. 5 shows a detailed view of pivot post support connections.

In FIG. 5 the interface between support posts 20 and pivot shaft 30 is shown in cross section. This cross section shows pivot support post recess 25 with matching detail the ends of pivot shaft 30 that provide the solid support of the design and the pocket that pivot shaft 30 resides in, providing little room for foreign matter to collect. Support post recess 25 provides a strong transverse pivot while preventing contamination at the pivot joint. Also shown is the threaded insert at the base of support post 20 for securely joining support post 20 to cutting support board base (10 though not shown here).

Figure 6:
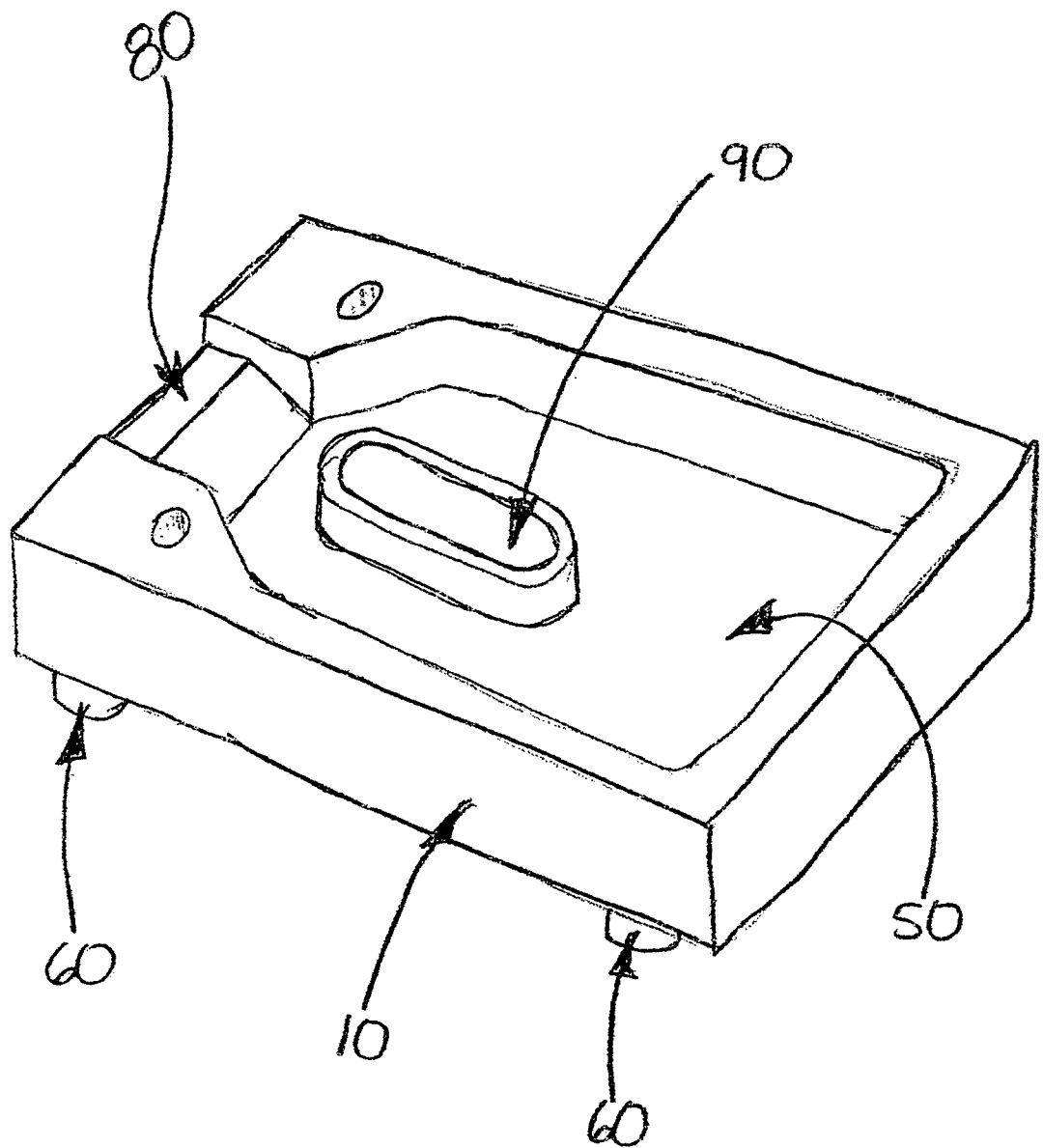
FIG. 6 shows an uncluttered view of the base of a preferred embodiment.

FIG. 6 has pivot supporting posts 20, pivot shaft 30 and knife 40 removed to provide a clearer view of juice pouring spout 80 and juice collection pocket 50. The transition of juices between collection pocket 50 and pouring 80 should be obvious from this figure. In addition, the large capacity of collection pocket 50 should also be evident. Board base 10 holding bivalve support pocket 90, collection pocket 50 and pouring spout 80 is shown with board base lifting feet 60.

Figure 7:
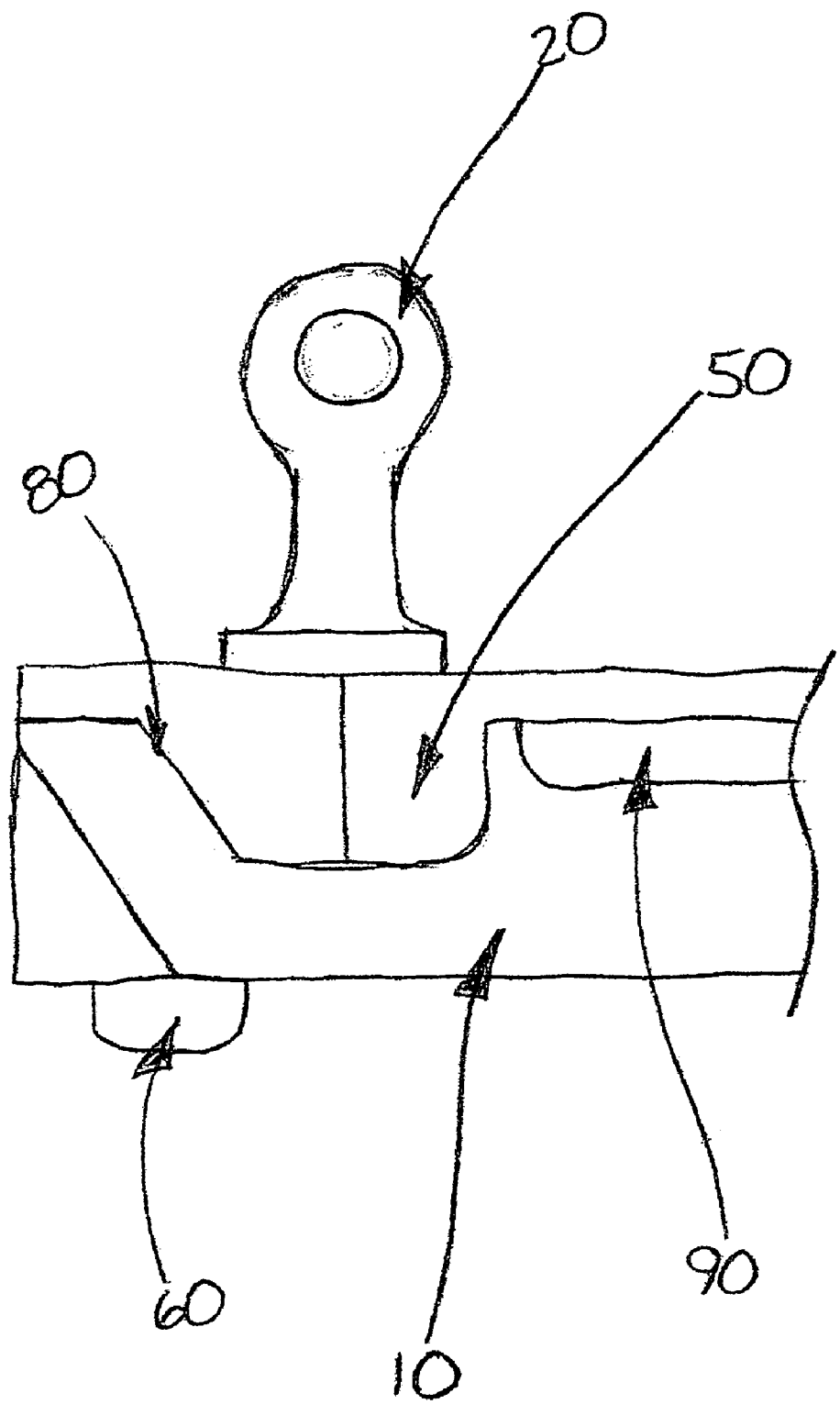
FIG. 7 illustrates a detailed cross section of the end of a preferred embodiment of the present invention, sliced through the pivot axis and base.

Finally FIG. 7 illustrates a partial cross section taken near the pivot end of the system, through the linear center of bivalve support pocket 90. This figure shows the proximity of juice collection pocket 50 to juice pouring spout 80 and the design of the integrated pouring spout 80. Also shown is the board base lifting foot 60 in the area of the pivot support post 20, under board base 10.

Having described preferred embodiments of the invention with reference to the accompanying drawings, it is to be understood that the invention is not limited to these precise embodiments, and that various changes, including in the selection of the garment portion of the system, and modifications may be effected therein by one skilled in the art without departing from the scope or spirit of the invention as defined in the appended claims.

What is claimed is:

1. A pivot action bivalve opening system, comprising:
   a cutting support board base, having a generally rectangular shape;
   raised walls around said base's edge forming a juice collection pocket;
   a set of five small lifting feet positioned on a bottom side of said base;
   a linear knife blade and handle securely attached near its blade end to a pivot shaft;
   a pair of pivot shaft support posts anchored in one side of said raised walls at one end of said support base;
   wherein said pivot shaft and attached knife blade are suspended between said support posts
   a raised pocket centered in said base such that a plane containing said knife blade's long axis bisects said raised pocket;
   wherein said raised pocket serves to support a bivalve shell upright when said knife blade is engaged with said bivalve's shell;
   wherein height of said pivot shaft supports and said knife blade is secured to said pivot shaft so as to permit said blade to rotate through at least 180 degrees;
   wherein said base has a juice pouring spout as part of said raised walls of said base; and
   wherein said base, walls and pocket are all fashioned out of a durable, bamboo wood with antibacterial properties.

2. The bivalve opening system according to claim 1, wherein only said knife blade and said pivot shaft are made from stainless steel.

3. The bivalve opening system according to claim 2, wherein said pivot support shafts are also made out of stainless steel.

4. The bivalve opening system according to claim 1, wherein said pocket is positioned and has a depth which permits said knife blade to separate said bivalve's shell halves and sever said bivalve's adductor muscles, as part of a full stroke of said knife and pivot shaft.

5. The bivalve opening system according to claim 1, wherein said juice collection pocket is large enough to hold up to three eight ounce cups of fluid.

6. The bivalve opening system according to claim 1, wherein bivalves are selected from the group consisting of: clams, quahogs, mussels, scallops, and mollusks.

7. The bivalve opening system according to claim 1, wherein said juice pouring spout is positioned in a wall section between said pivot support posts.

8. A method of opening a bivalve using a bivalve opening system according to claim 1, comprising the steps of:
   a) placing a bivalve in its shell into said support pocket with said shell's opening edge facing up towards said knife blade;
   b) grabbing said handle end of said knife blade and pivoting it around to bring its knife edge into contact with said bivalve shell;
   c) applying pressure to said handle, which through lever action applies a larger force to have said knife edge cut through said bivalve, separating said shell into halves;
   d) continue applying pressure until said knife edge cuts through said bivalve's adductor muscles, severing them;
   e) remove shell halves, meat of said bivalve and collect its juices; and finally
   f) clean pockets, blade and whole system.

* * * * *